United States Patent [19]

Cordier et al.

[11] 4,276,181
[45] Jun. 30, 1981

[54] PROCESS AND APPARATUS FOR SEPARATION BY COALESCENCE OF EMULSIONS

[75] Inventors: Michel Cordier, La-Celle-Saint-Cloud; Herve Labaquere, Le Pecq; Gilbert Saint-Dizier, Nanterre, all of France

[73] Assignee: Degremont, Hauts de Seine, France

[21] Appl. No.: 89,750

[22] Filed: Oct. 30, 1979

Related U.S. Application Data

[63] Continuation of Ser. No. 890,664, Mar. 27, 1978, abandoned.

[30] Foreign Application Priority Data

Mar. 28, 1977 [FR] France ............................... 77 09140

[51] Int. Cl.³ ............................................ B01D 17/04
[52] U.S. Cl. ................................... 210/741; 210/776; 210/794; 210/799; 210/801; 210/807; 210/108; 210/265; 210/266; 210/274; 210/277
[58] Field of Search ................. 210/20, 23 R, 81, 106, 210/269, 277, 30 A, 32, 39, 40, 120, 265, 266, 274, 297, 108, DIG. 5, 741, 776, 794, 799, 801, 807

[56] References Cited

U.S. PATENT DOCUMENTS

| | | | |
|---|---|---|---|
| 1,947,709 | 2/1934 | Garrison et al. | 210/23 R |
| 2,245,551 | 6/1941 | Adams et al. | 210/23 R |
| 2,257,244 | 9/1941 | Oehler | 210/23 R |
| 2,546,269 | 3/1951 | Lovelady | 210/23 R |
| 2,742,156 | 4/1956 | Spangler | 210/131 |
| 2,858,024 | 10/1958 | Babcock | 210/108 |
| 3,428,177 | 2/1969 | Duff | 210/108 |
| 3,717,251 | 2/1973 | Hampton | 210/80 |
| 3,794,583 | 2/1974 | Rhodes | 210/23 R |
| 3,853,753 | 12/1974 | Jones | 210/23 R |
| 4,039,441 | 8/1977 | Fett | 210/23 R |

*Primary Examiner*—Robert H. Spitzer
*Assistant Examiner*—David R. Sadowski
*Attorney, Agent, or Firm*—Wenderoth, Lind & Ponack

[57] ABSTRACT

A single enclosed chamber includes a lower destabilizing area, a central filtering and coalescence area containing coalescence material, and an upper flotation and separation area. Emulsion is introduced into the lower destabilizing area and is destabilized therein. The emulsion is then passed upwardly into the central filtering and coalescence area. The dispersed phase of the emulsion is attracted to the coalescence material in the form of droplets, and as the emulsion continues to pass upwardly therethrough the droplets grow in size. During passage of the emulsion through the filtering and coalescence material, matter in suspension is filtered from the emulsion. Within the flotation and separation area is located a separation device including a lower convergent portion and an upper divergent portion. The emulsion passes through this separation device, and the coalesced dispersed phase separates from the floats on the top of the dispersion phase within the area of the upper divergent portion of the separation device. The separated dispersed and dispersion phases are separately withdrawn. The pressure difference between the upper and lower sides of the coalescence material is measured as a indication of the degree of retention of mater in suspension within the coalescence material. When this pressure difference reaches a predetermined maximum, indicative of clogging of the coalescence material, the normal separation by coalescence treatment of the emulsion is stopped, and a washing liquid, which may be the emulsion to be treated, and a gas are introduced into the destabilizing area and passed upwardly through the coalescence material, thereby removing the matter in suspension.

20 Claims, 2 Drawing Figures

PROCESS AND APPARATUS FOR SEPARATION BY COALESCENCE OF EMULSIONS

This is a continuation of application Ser. No. 890,664, filed Mar. 27, 1978, now abondoned.

BACKGROUND OF THE INVENTION

The present invention relates to a process and apparatus for the treatment of organic emulsions including the separation by coalescence of the dispersed phase from the dispersion phase of the emulsion. The present invention is applicable particularly to such separation involving oily emulsions such as oil-field water, condensates occurring during operation in the petroleum industry, and to emulsions used in various mining industries for the treatment of ore, for example copper or uranium ore. It will be apparent from the following discussion however, that the process and apparatus of the present invention are applicable to the separation of a wide variety of organic emulsions.

Various processes are known for separating oil emulsions by coalescence. Such known processes include percolating an emulsion vertically from above or below, or horizontally, through an organic or inorganic granular material. During such percolation, oily droplets of the dispersed phase of the emulsion are formed on the granular material, and the size of these droplets are increased by coalescence, whereafter the coalesced droplets are separated from the dispersion phase, normally water, through a continuous exhaust operation or through sedimentation.

However, the granular coalescence material gradually becomes clogged due to retention of matter in suspension which is always present to a certain degree in the emulsion to be treated. It thus becomes necessary to remove the coalescence material and to either destroy or clean it outside the apparatus. This is of course a complex and costly operation.

To overcome these disadvantages, it has been attempted to wash the coalescence material while remaining in the apparatus. Such processes have however normally involved the injection of a washing liquid in a direction countercurrent to the direction of normal operation of the apparatus. Such processes have not however resulted in a thorough and complete washing of the coalescence material, particularly when the matter in suspension is present therein in large quantities.

Additionally, various other improvements have been attempted in known processes of separating organic emulsions by coalescence. For example, it has been attempted to add an "oleophilizing" organic compound to the coalescence material in an attempt to increase its capacity for retaining or attracting the oily dispersed phase of the emulsion. Such compounds are normally based on various types of hydrocarbons or amines. Further improvements have involved the addition to the emulsion to be treated of cationic polyelectrolytes of high molecular weight.

All of the above known processes, however, are still associated with certain operational disadvantages.

SUMMARY OF THE INVENTION

Accordingly, it is a primary object of the present invention to provide a process and apparatus which eliminates the disadvantages of known systems for separating organic emulsions by coalescence.

A more specific object of the present invention is to provide such a process and apparatus which appreciably improves the efficiency of separation and which is applicable to a broader range of organic emulsions, and particularly to emulsions containing relatively large amounts of matter in suspension.

An even further object of the present invention is to provide such a process and apparatus which is not restricted to only oily emulsions, but which is applicable generally to all types of organic emulsions, and specifically to emulsions which contain a gas, such as petroleum-field water.

An even further object of the present invention is to provide such a process and apparatus which is directly usable in petroleum fields in such a manner that oil recovered during separation is very pure and of a quality which may be recovered as usable petroleum.

The above objects are achieved in accordance with the present invention by the provision of a process and apparatus wherein an emulsion to be treated is introduced into a single enclosed chamber and passed successively upwardly therein through a lower destabilizing area wherein the emulsion is destabilized, then into a central filtering and coalescence area containing therein a filtering and coalescence material which filters out matter in suspension and which attracts the dispersed phase in droplet form such that the droplets grow in size during upward passage therethrough, and then into an upper flotation and separation area wherein the coalesced droplets of dispersed phase separate from and float on top of the thus purified dispersion phase.

The flotation and separation area has therein a separation device including a lower convergent portion in the form of a hollow truncated cone and an upper divergent portion in the form of a hollow truncated cone. The emulsion passes upwardly through the separation device, and the coalesced dispersed phase separates from and floats on top of the dispersion phase within the area of the upper divergent portion of the separation device. The thus separated dispersed phase is withdrawn through the top of the enclosed chamber. An upper part of the upper divergent portion of the separation device is in the form of a filtering material. The separated and substantially purified dispersion phase passes radially outwardly through the filter material, thereby filtering out any residual small droplets of dispersed phase, and passes into a collection area located between the chamber and the separation device. Within the collection area is located a collection device which collects the purified water and passes it outwardly through the chamber.

During the above described normal separation operation, the pressure difference between the lower and upper sides of the coalescence material is measured as an indication of the degree of retention by the coalescence material of the matter in suspension from the emulsion. When this pressure difference reaches a predetermined maximum value, representative of clogging of the coalescence material by the matter in suspension, the normal separation operation of the apparatus is terminated, and a coalescence material washing operation is commenced.

This washing operation involves firstly the injection of a washing liquid and a gas into the destabilizing area and then upwardly through the coalescence material, thereby removing matter in suspension from the coalescence material, and secondly the injection of a washing liquid only to rinse the coalescence material. The washing liquid is withdrawn from the chamber at a position located above the upper level of the coalescence material, but below the flotation and separation area. Thus, the matter in suspension withdrawn during the washing operation is not passed through the flotation and separation area, and cannot contaminate the separation device, particularly the filtering material portion thereof, and the purified dispersion phase.

In accordance with a specific preferred feature of the present invention, the washing liquid may include the emulsion to be treated itself. The passage of this emulsion as a washing liquid through the coalescence material operates to re-oleophilize the coalescence material, i.e. operates to re-establish its capacity for attracting and retaining the disperse phase of the emulsion. This feature of the present invention also provides the advantage in that a large washing supply of purified water need not be maintained for the washing operation, thereby providing an important space saving advantage.

BRIEF DESCRIPTION OF THE DRAWINGS

Other objects, features and advantages of the present invention will be apparent from the following detailed description of a preferred embodiment thereof, taken with the accompanying drawings, wherein.

DETAILED DESCRIPTION OF THE INVENTION

Figure 1:
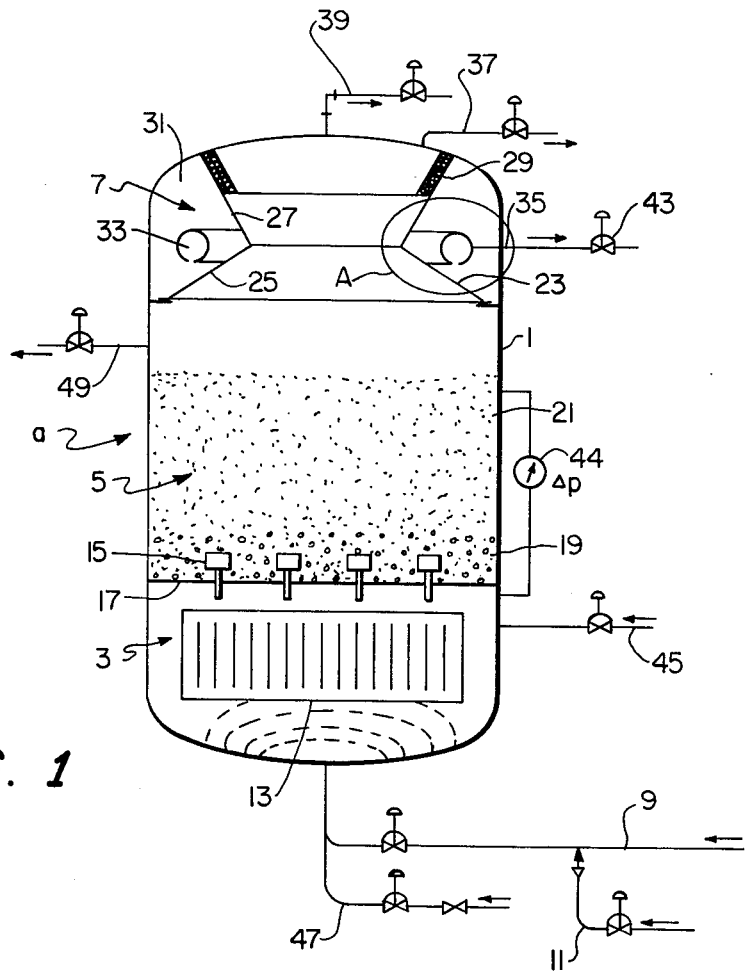
FIG. 1 is a schematic view of one embodiment of the present invention.
Figure 2:
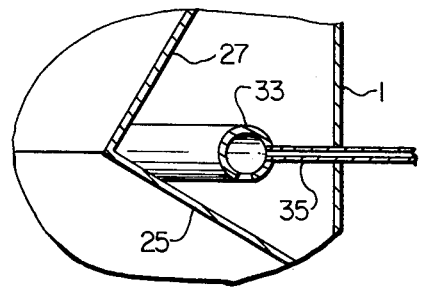
FIG. 2 is an enlarged view of that portion of the apparatus denoted A in FIG. 1.

The following description will deal with a specific apparatus and process which are within the scope of the present invention. It is however to be understood that the invention is not limited to the specific shapes, structures, proportions or arrangements described, but that the invention is intended to encompass modifications thereof without departing from the scope of the invention.

The apparatus of the invention, generally designated by reference letter a, includes an enclosed chamber 1 which in the illustrated embodiment is cylindrical. It is to be understood however that chamber 1 could have a configuration other than cylindrical.

The interior of chamber 1 is divided into three superimposed areas, i.e. a lowermost destabilizing area 3, a central filtering and coalescence area 5, and an upper flotation and separation area 7. The construction and operation of each of these three areas will be discussed in more detail below.

A supply line 9 is provided for introducing an emulsion to be treated into the destabilizing zone 3. If desired, line 11 may be provided for introducing a known cationic polyelectrolyte having a high molecular weight into the emulsion. Such polyelectrolytes are known to provide a treatment or conditioning of the emulsion which promotes later coalescence of droplets of the dispersed phase of the emulsion. Those ordinarily skilled in the art would understand which specific cationic polyelectrolytes could be employed for treatment or conditioning of a particular emulsion, and the particular polyelectrolytes employed are not critical to the present invention.

Within the destabilizing area 3 there is located a conventional distributor 13 which has a twofold purpose in the present invention. Firstly, distributor 13 operates to impart a turbulence to the emulsion within area 3 to thereby destabilize the emulsion. Secondly, distributor 13 operates to impart a laminar and uniform flow of the destabilized emulsion toward the second area 5. The particular configuration of distributor 13 does not in and of itself form a portion of the invention. It is contemplated that any conventional and known distributor which is capable of imparting a destabilizing turbulence to the emulsion and causing the destabilized emulsion to flow upwardly in a uniform laminar manner may be employed. The time of stay of the emulsion in area 3 will vary as a function of the particular emulsion being treated. Such time of stay of the emulsion within area 3 may vary from approximately thirty to three hundred seconds.

The destabilized emulsion is passed from area 3 into filtering and coalescence area 5 via slots in nozzles or bushings 15. Nozzles 15 may be supported in a bottom wall 17 which separates area 3 from area 5. Nozzles 15 may be of any conventional configuration known in the art, the important structural features of the nozzles being that there be a sufficient number and location of nozzles 15 to ensure a uniform supply of the destabilized emulsion into the bottom of area 5 and that the slots in the nozzles 15 be of a dimension to ensure that the destabilized emulsion cannot become re-stabilized or re-constituted during its passage into area 5.

Within area 5 is located a layer 19 of supporting material, for example gravel, which extends transversely across the entire width of the chamber 1. Layer 19 rests on wall 17 and supports a layer 21 of coalescence material, the purpose of which is to filter out and attract the droplets of the dispersed phase of the destabilized emulsion and cause such droplets to coalesce into larger droplets. Coalescence material 21 may be a known and conventional solid organic or inorganic material which has a surface condition allowing adsorption of oleophilizing compounds. Examples of the coalescence material are silica, oxides, silico aluminates, charcoal and other organic or inorganic material having oleophilizable surface properties, i.e. properties making it possible to restore the oil-retaining or dispersed phase-retaining capacity of the material.

The coalescence material 21 is relatively fine, having a grain size of for example 0.5 to 3 mm, and has a relatively low specific mass, for example one to 2.5. These properties are however preferable only, and it is not intended that the present invention be limited to these specific properties. The height of the layer of coalescence material 21 advantageously may be from approximately one to 1.4 m, and the height of the layer of supporting material 19 may for example be from 0.1 to 0.2 m. Again however, it is not intended that the present invention be limited to these dimensions, inasmuch as such dimensions will vary dependent upon the particular installation involved and the particular emulsion being treated.

During passage of the emulsion upwardly through filtering and coalescence area 5, the dispersed phase of the destabilized emulsion will be attracted to the coalescence material in droplet form, and the size of these droplets will gradually increase during passage of the emulsion upwardly through material 21 by coalescence.

Spaced somewhat above coalescence material 21 is located flotation and separation area 7. The purpose of this area is to separate the coalesced droplets of the dispersed phase of the emulsion from the purified water, or other dispersion medium of the emulsion.

Within area 7 is located a convergent-divergent separation device 23 including a lower convergent portion 25 in the form of a truncated hollow cone and an upper divergent portion 27 in the form of a truncated hollow cone. The convergent-divergent configuration of device 23 operates to ensure that the coalesced droplets of the dispersed phase of the emulsion are gathered into the upper portion of the device. The purified water, now substantially separated from the coalesced droplets of dispersed phase, filters from the interior of device 23 through a filtering portion 29 provided in the upper part of divergent portion 27. The purpose of filtering portion 29 is to retain any possible remaining droplets of the dispersed phase that would still be of a size which is insufficient to allow flotation thereof to the top of the liquid. The thus filtered purified water then passes into a collection area 31 and collects in a purified water collector 33, which in the illustrated embodiment is of a toroidal configuration, and then is withdrawn outwardly through the chamber by a line 35.

The convergent portion 25 of device 23 preferably has a vertical height of approximately 100 to 500 mm and may extend at an angle of approximately 90° to the vertical. The divergent portion 27 of device 23 may have a vertical height of approximately 100 to 600 mm, and may extend at an angle of approximately 0° to 40° to the vertical. It is however to be understood that these dimensions are intended to be entirely exemplary only and that the present invention is in no way limited to these specific features.

The grain size of filtering material 29 may vary from approximately two to five mm, and the thickness of filter separator 29 may be from approximately five to twenty cm. The precise position and inclination of filter separator 29 may be varied to obtain a maximum retention of very fine residual droplets of the dispersed phase. These specific dimensions of grain size and thickness are not however intended to in any way limit the scope of the present invention.

The coalesced dispersed phase of the emulsion may be recovered continuously through a pipe 37 located in the upper portion of the chamber. Also, if necessary and desired, gas may be removed through a vent pipe 39.

The above description will explain the normal operation of the device a.

However, periodically the coalescence material 21 will become plugged or clogged, for example by matter in suspension in the emulsion. When this occurs, it is necessary to wash the coalescence material 21.

In accordance with the present invention the need for a washing operation may be automatically controlled by a detection device 44 which measures a loss of pressure between the bottom and the top of the coalescence material. That is, when device 44 detects a predetermined maximum pressure differential between the bottom and the top of the coalescence material 21, then device 44 may trigger the termination of normal coalescence operation and the initiation of a washing operation. When this is done, valve 43 in purified water outlet pipe 35 is closed. Thus, collector 33 will remain totally immersed in the purified water which is retained in area 31. The still "oily" water within convergent-divergent device 23 is entirely emptied through pipe 37. Thereafter, the clogged coalescence material 21 is washed. This is achieved by introducing a non-destabilized emulsion, as a washing water, through pipe 9 in conjunction with simultaneously blowing a gas, for example air or natural gas, through a pipe 45. The washing water could alternatively be a treated water introduced through pipe 47.

As the washing water passes upwardly through the coalescence material 21, matter in suspension previously retained in the coalescence material is eliminated therefrom by the washing water and is removed through a pipe 49 located at a position above the surface of the filtering and coalescence material 21. Then a second cycle of washing water is introduced, either through line 9 or line 47, and without the gas introduced through line 45, to effect a rinsing of the coalescence material. The washing water removed through pipe 49 during the washing and rinsing operation may be, if desired, recycled to another portion of the overall installation or evacuated into a drain.

In accordance with the present invention, the collection and evacuation of washing water at a location outside the area of flotation, i.e. below the device 23, makes it possible to avoid the introducing of matter in suspension into the device 23, and specifically into filter separator 29. Therefore, when the installation is thereafter again employed for normal operation, the matter in suspension previously removed from the coalescence material during washing is not present in the filtering separator 29 and is thus not introduced into the treated water. Further, by withdrawing the washing water at pipe 49 located below the flotation area, the washing water containing therein removed matter in suspension will obviously not pass through filtering separator 29 and into the treated water located in area 31.

Even further, in accordance with the present invention, the washing operation eliminates the formation of preferred passages that might otherwise be formed in the coalescence material, thereby ensuring the homogeneity of the bed of coalescence material.

Even further, in accordance with the present invention, the washing water may be the crude emulsion itself. This tends to "re-oleophilize" the coalescence material, i.e. to re-establish its capacity for attracting droplets of the dispersed phase of the emulsion.

Even further, by employing a crude destabilized emulsion as the washing liquid, it is possible to avoid the heretofore necessity of maintaining a storage of treated water to use for the washing operation. This represents an important space saving which is important in many operations, for example on ocean oil drilling platforms.

After completion of the washing operation, the device will be returned to normal operation.

The following examples illustrate results obtained in treatments of various emulsions in accordance with the present invention.

EXAMPLE 1

An apparatus a in accordance with the present invention had a cylindrical shape, an outer diameter of approximately 800 mm, and a height of approximately 3200 mm. The emulsion treated was petroleum-field water originating in a low pressure (4 bar) separator for crude petroleum, field water and gas. The emulsion had a temperature of 80° to 90° C., a salinity of 90 to 100 g/liter, and a concentration of hydrocarbons of 200 to 2000 ppm.

The emulsion was supplied into the apparatus in quantities of 12 m$^3$/hour. The fluid passed through the filtering and coalescence area 5 at a speed of 25 m$^3$/m$^2$/hour. The area 5 had a height of 1600 mm and included a lower layer 19 of gravel having a height of 200 mm. The coalescence material 21 was sand having a grain size of from 0.5 to 3 mm and had a height of 1400 mm. The flotation area included a convergent-divergent device 23 including a convergent portion 25 extending at an angle of 90° and a divergent portion 27 extending at an angle of 26°. The total height of device 23 was 320 mm. The velocity of the flow passing through the separator in the area of flotation, as well as the outlet velocity of the treated water was 35 $m^3/m^2$/hour. The contact time between the polyelectrolyte and the emulsion in the destabilization area 3 was approximately two minutes.

The following Table 1 shows the results obtained, on an average for a week of treatment. The volume of oil recovered was greater than one barrel per day, such oil being of a quality to be passed into the oil pipeline.

TABLE 1

| Crude Water | | | Characteristics of Treatment | | Characteristics of Treated Water | |
|---|---|---|---|---|---|---|
| Hydrocarbons (mg/liter) | Temperature °C. | Origin | Polyelectrolyte mg/liter | Speed ($m^3/m^2$/h) | Hydrocarbons (mg/liter) | Matter in Suspension (mg/liter) |
| 200 to 600 | 30 to 85 | Separator for water, oil and gas; Pressure: 4 bar | 0.5 | 25 | <10 | <1 |
| 1000 to 2000 | 75 to 80 | Separator for water, oil and gas; Pressure: 4 bar | 2 | 25 | 20–30 | <1 |
| 150 to 300 | 90 to 85 | Atmospheric-pressure Separator for water and oil | 0.2 | 25 | <10 | <1 |

EXAMPLE 2

Oily condensates obtained from vapors employed for reheating crude petroleum were treated in the same manner as discussed above in Example 1.

The time of stay of the emulsion in destabilizing area 3 was approximately two minutes. The flow through the coalescence area 5 was at a velocity of approximately 20 $m^3/m^2$/hour, and the velocity at which the treated water was recovered as well as that at which it passed through the separator in the area of flotation was approximately 25 $m^3/m^2$/hour.

After a simple finishing treatment, the deoiled water thus obtained could be recycled to the boilers. The results obtained are shown in the following Table 2 and represent the average for a week of treatment.

TABLE 2

| Crude Water | | Characteristics of Treatment | | Characteristics of Treated Water | |
|---|---|---|---|---|---|
| Oil (mg/liter) | Temperature | Polyelectrolyte (mg/liter) | Speed ($m^3/m^2$/h) | Oil (mg/liter) | Matter in Suspension |
| 20 to 50 | 60 to 95° C. | 0.2 | 20 | 5 | <1 |

EXAMPLE 3

A concentrated solution of copper sulfate containing therein kerosene in emulsion obtained from the treatment of copper ore and intended for use in electrolysis was treated.

The emulsion was maintained within the destabilizing area 3 for approximately forty seconds. The flow through the coalescence area 5 occurred at a speed of approximately 20 $m^3/m^2$/hour, and the treated water was recovered at a speed of approximately 25 $m^3/m^2$/hour.

The results are shown in the following Table 3 and represent the average for a week of treatment.

TABLE 3

| Crude Water | | Characteristics of Treatment | | Characteristics of Treated Water |
|---|---|---|---|---|
| Kerosene (mg/liter) | Temperature | Polyelectrolyte (mg/liter) | Speed ($m^3/m^2$/h) | Kerosene (mg/liter) |
| 40 to 10,000 | 25 to 30° C. | 0.2 | 20 | 7 |

Although a specific embodiment of the apparatus and process of the present invention has been described above in detail, it is specifically to be understood that various modifications may be made thereto without departing from the scope of the invention.

What we claim is:

1. A process for treating organic emulsions including separating by coalescence the disperse phase from the dispersion phase of the emulsion, said process comprising:
   providing within a single enclosed chamber a lower destabilizing area, a central filtering and coalescence area containing therein coalescence material, and an upper flotation and separation area;
   conducting a coalescence treatment operation comprising:
   introducing an emulsion to be treated into said lower destabilizing area and therein imparting turbulence to said emulsion and destabilizing all of said emulsion to form a destabilized emulsion while imparting a laminar and uniform upward flow to said destabilized emulsion;
   passing all of said destabilized emulsion upwardly into said filtering and coalescence area and therein causing the disperse phase of said emulsion to be attracted to said coalescence material in the form of droplets, and continuing to pass all of said emulsion upwardly through said filtering and coalescence area such that said droplets of disperse phase grow in size by coalescene during such upward passage, said coalescene material filtering out matter in suspension from said emulsion during such upward passage, to thereby form a filtered and coalesced emulsion including a filtered dispersion phase and coalesced droplets of said disperse phase;

passing all of said filtered and coalesced emulsion upwardly into said upper flotation and separation area and therein causing said filtered dispersion phase and said coalesced disperse phase to separate by flotation, said flotation and separation area including a separation area including a separation device comprising a lower convergent portion in the form of a hollow truncated cone and an upper divergent portion in the form of a hollow truncated cone, said filtered and coalesced emulsion passing upwardly through said separation device, and said coalesced disperse phase separating from and floating on top of said filtered dispersion phase within said upper divergent portion; and separately withdrawing from said chamber the thus separated filtered dispersion phase and coalesced disperse phase;

determining the pressure difference between the lower and upper sides of said coalescence material as an indication of the degree of retention of said matter in suspension within said coalescence material; and terminating said coalescence treatment operation and commencing a coalescence material washing operation upon the determination of a predetermined pressure difference representative of clogging of said coalescence material, said washing operation comprising:

injecting a washing liquid and a gas into said destabilizing area and then upwardly through said coalescence material in said filtering and coalescence area;

thereafter injecting a washing liquid only, as a rinsing liquid, into said destabilizing area and then upwardly through said coalescence material;

thereby removing matter insuspension from said coalescence material; and withdrawing said washing liquid, with said removed matter in suspension, from said chamber at a position above the upper level of said coalescence material but below the level of entrance into said upper flotation and separation area.

2. A process as claimed in claim 1, wherein during said coalescence treatment operation said coalesced disperse phase is continuously withdrawn from said chamber.

3. A process as claimed in claim 1, wherein said washing liquid comprises said emulsion to be treated.

4. A process as claimed in claim 1, wherein said gas comprises air.

5. A process as claimed in claim 1, wherein said gas comprises natural gas.

6. A process as claimed in claim 1, further comprising, during said coalescence treatment operation, separately removing from the top of said flotation and separation area any gas contained in said emulsion to be treated.

7. A process as claimed in claim 1, wherein said emulsion to be treated comprises petroleum field water.

8. A process as claimed in claim 1, wherein said emulsion to be treated comprises oily condensate water.

9. A process as claimed in claim 1, wherein said emulsion to be treated comprises an organic emulsion from the treatment of ore.

10. A process as claimed in claim 1, wherein an upper part of said upper divergent portion is formed of a filter material, and said filtered dispersion phase passes radially outwardly through said filter material, thereby filtering out any residual droplets of said disperse phase which are of a size insufficient to float to the top of said dispersion phase.

11. An apparatus for treating organic emulsions by separating by coalescence the disperse phase from the dispersion phase of the emulsion, said apparatus comprising:

a single enclosed chamber having therein a lower destabilizing area, a central filtering and coalescence area, and an upper flotation and separation area;

means for introducing an emulsion to be treated into said lower destabilizing area such that all of said emulsion passes successively upwardly through said destabilizing area, said filtering and coalescence area and said flotation and separation area;

destabilizing means, positioned in said destabilizing area, for imparting turbulence to said emulsion and destabilizing said emulsion and causing said emulsion to flow in a laminar and uniform manner toward said filtering and coalescence area;

a layer of granular filtering and coalescence material, positioned within said filtering and coalescence area, for filtering out matter in suspension from said emulsion and for attracting the disperse phase of said emulsion in droplet form such that the droplets grow in size by coalescence during upward passage of said emulsion through said filtering and coalescence area;

separation means positioned within said flotation and separation area, for causing the coalesced droplets of disperse phase to separate by flotation from the dispersion phase of said emulsion, said separation means comprising a separation device including a lower convergent portion in the form of a hollow truncated cone, and an upper divergent portion in the form of a hollow truncated cone, said coalesced disperse phase separating from and floating on top of said dispersion phase within said upper divergent portion;

first withdrawal means for withdrawing said coalesced disperse phase from said chamber;

second withdrawal means, separate from said first withdrawal means, for withdrawing said dispersion phase from said chamber;

means for determining the pressure difference between the lower and upper sides of said filtering and coalescence material as an indication of the degree of retention of said matter in suspension within said filtering and coalescence material;

means, responsive to the determination of a predetermined pressure difference representative of clogging of said filtering and coalescence material, for initiating a washing operation including injecting first a washing liquid and a gas, and then a washing liquid only as a rinsing liquid, into said destabilizing area and then upwardly through said filtering and coalescence material to remove therefrom said matter in suspension; and means, located at a position above the upper level of said filtering and coalescence material but below the level of entrance into said upper flotation and separation area, for removing said washing liquid, with said removed matter in suspension therein.

12. An apparatus as claimed in claim 11, wherein said washing liquid comprises said emulsion to be treated.

13. An apparatus as claimed in claim 11, further comprising third withdrawal means for separately removing from the top of said flotation and separation area any gas contained in said emulsion to be treated.

14. An apparatus as claimed in claim 11, wherein said means for initiating a washing operation includes means for closing said second withdrawal means.

15. An apparatus as claimed in claim 11, wherein an upper part of said upper divergent portion is formed of filter material, such that said dispersion phase passes radially outwardly through said filter material into a collection area located between said chamber and said separation device, thereby filtering from said dispersion phase any residual droplets of said disperse phase which are of a size insufficient to float to the top of said dispersion phase.

16. An apparatus as claimed in claim 15, wherein said second withdrawal means comprises a collector device located within said collection area, and a pipeline extending outwardly from said collection device through said chamber.

17. An apparatus as claimed in claim 11, further comprising a bottom wall separating said destabilizing area from said filtering and coalescence area, said filtering and coalescence material being supported by said bottom wall.

18. An apparatus as claimed in claim 17, further comprising nozzle means extending through said bottom wall for allowing passage of said emulsion, destabilized within said destabilizing area, from said destabilizing area to said filtering and coalescence area, said nozzles having therein openings of a size to prevent re-stabilization of said emulsion.

19. An apparatus as claimed in claim 11, wherein said filtering and coalescence material comprises a solid material having a grain size of from 0.5 to 3.0 mm, a specific mass of from 1.0 to 2.5, and the property of surface adsorption of olephilizing compounds.

20. An apparatus as claimed in claim 19, wherein said filtering and coalescence material is supported on a layer of coarser grain size gravel.

* * * * *